(12) United States Patent
Ghanekar et al.

(10) Patent No.: US 8,060,510 B2
(45) Date of Patent: Nov. 15, 2011

(54) BEST FIT MAP SEARCHING

(75) Inventors: Joy Ghanekar, San Francisco, CA (US); Jerry Cheng, Mountain View, CA (US); Denis Hänikel, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 221 days.

(21) Appl. No.: 12/432,172

(22) Filed: Apr. 29, 2009

(65) Prior Publication Data

US 2010/0211909 A1    Aug. 19, 2010

Related U.S. Application Data

(60) Provisional application No. 61/152,667, filed on Feb. 13, 2009.

(51) Int. Cl.
*G06F 3/048* (2006.01)
*G06F 17/30* (2006.01)

(52) U.S. Cl. .................. 707/736; 707/921; 715/802

(58) Field of Classification Search .................. 707/736, 707/919, 921; 715/788, 790, 794, 800, 802
See application file for complete search history.

(56) References Cited

U.S. PATENT DOCUMENTS

| | | | |
|---|---|---|---|
| 6,853,912 B2* | 2/2005 | Han | 701/208 |
| 7,379,811 B2* | 5/2008 | Rasmussen et al. | 701/208 |
| 7,576,754 B1* | 8/2009 | Joseph et al. | 345/619 |
| 2006/0200384 A1* | 9/2006 | Arutunian et al. | 705/14 |
| 2008/0091349 A1* | 4/2008 | Liu | 701/211 |
| 2008/0154888 A1* | 6/2008 | Buron et al. | 707/5 |
| 2009/0075761 A1* | 3/2009 | Balardeta et al. | 473/407 |
| 2009/0204892 A1* | 8/2009 | Cheung et al. | 715/249 |

* cited by examiner

*Primary Examiner* — James Trujillo
*Assistant Examiner* — Jorge A Casanova
(74) *Attorney, Agent, or Firm* — Weaver Austin Villeneuve and Sampson LLP

(57) ABSTRACT

A search engine computer system is configured to produce an optimized display of maps especially useful in mobile handheld devices with comparatively small screens. The system factors in scoring functions, visibility, and empirical data on map levels to provide optimal map based results to users. This minimizes or avoids graphical results that overlap each other.

18 Claims, 6 Drawing Sheets

Example: "sushi" Location: San Francisco [L/L: 37.77916, -122.420067]

| Zoom | G(z) | (F1) = # of visible results/total num of results | V(z,Points) | Score |
|---|---|---|---|---|
| 1 | 0.2 | 0 | 0 | 0 |
| 2 | 0.5 | 0 | 0 | 0 |
| 3 | 0.9 | 0 | 0 | 0 |
| 4 | 1.0 | 0.2 | 1.0 | 0.2 |
| 5 | 0.5 | 0.4 | 1.0 | 0.2 |
| 6 | 0.1 | 0.8 | 1.0 | 0.08 |
| 7 | 0.02 | 1.0 | 0.78 | 0.015 |
| 8 | 0.002 | 1.0 | 0.55 | 0.00104 |

*FIG. 3A*

Example: "Mc Donalds" Location: Sunnyvale, CA [L/L: 37.37159, -122.038239]

| Zoom | G(z) | (F1) = # of visible results/total num of results | V(z,Points) | Score |
|---|---|---|---|---|
| 1 | 0.2 | 0 | 0 | 0 |
| 2 | 0.5 | 0 | 0 | 0 |
| 3 | 0.9 | 0 | 0 | 0 |
| 4 | 1.0 | 0.1 | 1.0 | 0.1 |
| 5 | 0.5 | 0.3 | 1.0 | 0.15 |
| 6 | 0.1 | 0.4 | 1.0 | 0.04 |
| 7 | 0.02 | 1.0 | 0.995 | 0.019 |
| 8 | 0.002 | 1.0 | 0.85 | 0.0017 |

FIG. 3B

BEST FIT MAP SEARCHING

CROSS REFERENCE TO RELATED APPLICATION

This application claims the benefit of provisional application No. 61/152,667 to Ghanekar, Cheng and Hänikel, filed on Feb. 13, 2009, which is hereby incorporated by reference in the entirety.

BACKGROUND OF THE INVENTION

This invention relates generally to searching and to maps, and more specifically to organization and display of a map containing information relevant to a search.

FIG. 1 shows one prior technique and device for displaying search results on a map. In this technique, all the results up to a certain number are displayed. This makes taking in the displayed information rather difficult. In particular, it suffers from the following drawbacks: 1) the zoom level may be too high resulting in loss of location context; 2.) if panning occurs in addition to a zoom change, further loss of location context results; and 3.) if there are outlier results, some outlier results, bunching of results in closer proximity to the desired location will result in visual overlay and information loss. For example, if one or two results are much further than the other results, such as results 1 and 8 in FIG. 1, the other results overlap each other and the user cannot resolve the number of the results on the map and/or the street location, as they are obscured by the other results.

Other prior solutions may result in a better distribution, but move the center of the displayed map in order to do so, which is disorienting to users and undesirable.

SUMMARY OF THE INVENTION

Embodiments of the invention produce an optimized display of maps especially useful in mobile handheld devices with comparatively small screens. The systems and methods factor in scoring functions, visibility, and empirical data on readability and/or user preference of map levels to provide optimal map based results to users. This minimizes or avoids graphical results that overlap each other.

One aspect relates to a computer system for providing search results to a group of users. The computer system is configured to: perform a search for points of interest at a specified location, the search producing search results; obtain viewport parameters including the size of the viewport; and compute a composite score indicative of a best fit for a map including graphical representations of the search results within the viewport. The composite score is computed based upon a scoring function, a visibility function, and a zoom level distribution function. The computer system is further configured to provide the search results as icons upon a map sized to fit the viewport of a device, the map centered at the specified location.

Another aspect relates to a method for providing and configuring a map in conjunction with a search report. The method comprises: performing a search for points of interest at a specified location, the search producing search results including a group of found points of interest; referencing viewport parameters of a user viewport including dimensions of the viewport; transforming the search results into an image comprising a map centered at the specified location and an icon positioned at each location of each of the group of found points of interest. Transforming comprises calculating a score based on a composite function, the score indicative of a best fit for the icons and found points of interest within the map, the composite function comprising a scoring function, a visibility function, and a zoom distribution function. The method also comprises providing the image comprising the transformed search results.

A number of scoring functions may be used, alone or in conjunction with other scoring functions. In addition to purely graphical considerations, scoring functions may relate to and provide weighting based upon monetization and review/ratings of selected points of interest.

A further understanding of the nature and advantages of the present invention may be realized by reference to the remaining portions of the specification and the drawings.

BRIEF DESCRIPTION OF THE DRAWINGS

FIG. 3A illustrates a table depicting scores at various zoom levels for an exemplary search.

FIG. 3B illustrates a table depicting scores at various zoom levels for another exemplary search.

DETAILED DESCRIPTION OF SPECIFIC EMBODIMENTS

Figure 1:
FIG. 1 illustrates a map showing search results according to the prior art.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

While the present invention may be utilized to provide search results to any type of computing device, including a personal computer with a relatively large screen, it is particularly useful with hand held mobile devices such as mobile phones, personal digital assistants, global positioning receivers, and other devices capable of displaying a map. The handheld mobile devices typically have a relatively small screen, and the present invention improves the graphical presentation of map based results on such screens.

Other constraints typically present in devices for which the present invention is most beneficial include but are not limited to the following. Local search results are a combination of distance, relevancy, rating and reviews. Business listings are distributed unevenly around any given point. The number of search results is variable and may differ greatly from one search to another. User disorientation also often results when zooming and/or panning occurs, as the original map center may become obscured or even removed from the field of view.

DEFINITIONS:

POI: Point of Interest (A single business listing, traffic incident etc)
Viewport: The map viewing window. Can be less than the actual screen size
Map Viewport Width: The width of the map/viewport.
Map Viewport Height: The height of the map/viewport.
Map Viewport Area: The area of the Viewport, defined by its Width and Height
High Zoom Level: Map is zoomed out (more area covered)
Low Zoom Level: Map is zoomed in (less area covered)
Clustering: Close grouping of POIs. On high zoom levels, screen distance between POIs is reduced causing overlap of POIs
Lat/Lon: Latitude and longitude of a point on the map
Original map center: Lat/Lon of the center of the map when user executes search. Local search is a radial search around a specific point (lat/lon).

Embodiments of the present invention transform location based searches and search results into map images where the results are displayed within the map. This is advantageous in all environments as they preserve the original map center while reducing clustering and provide a meaningful number of results in a device viewport.

A best fit technique is used in a search engine system, and enables the system to provide improved graphical map based results that are more readily absorbable by the user and provide more options to manipulate and drill down into results once presented. The technique may also be used in any environment where plotting items upon a map is desirable. This is particularly useful for constrained screen environments such as handheld computing devices like mobile phones.

The best fit technique combines different scoring functions in order to identify the optimal zoom level and number of points in the map viewport given some total set of points. The different scoring functions (F1 ... Fn), a visibility function (V), and a distribution factor/function (G) are all factored into the technique. In some embodiments it sizes the icon used to note the location of each relevant point of interest in relation to a viewport area and the number of relevant points of interest.

Figure 2A:
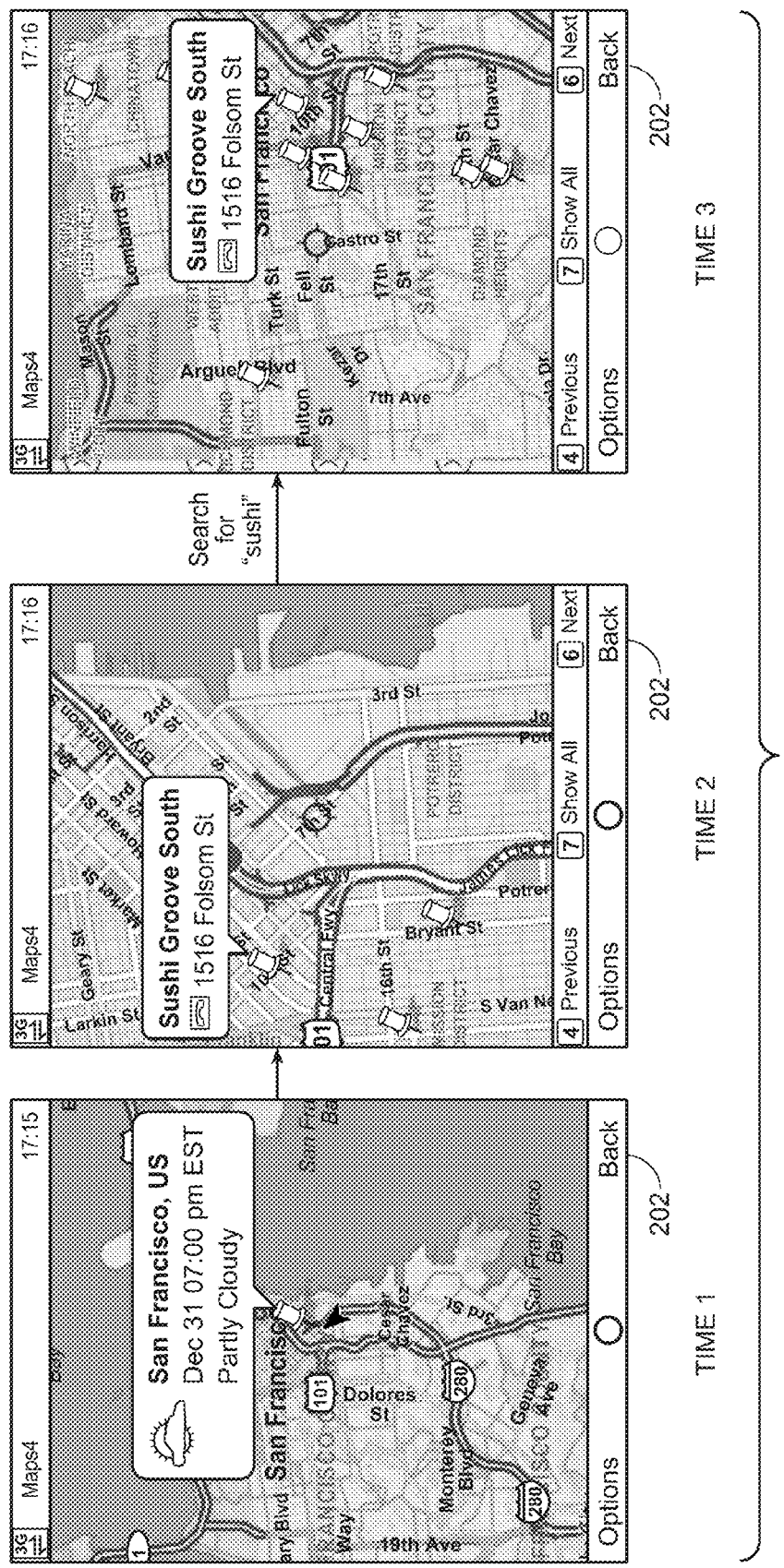
FIG. 2A illustrates maps displayed in a viewport of a user device.
Figure 2B:
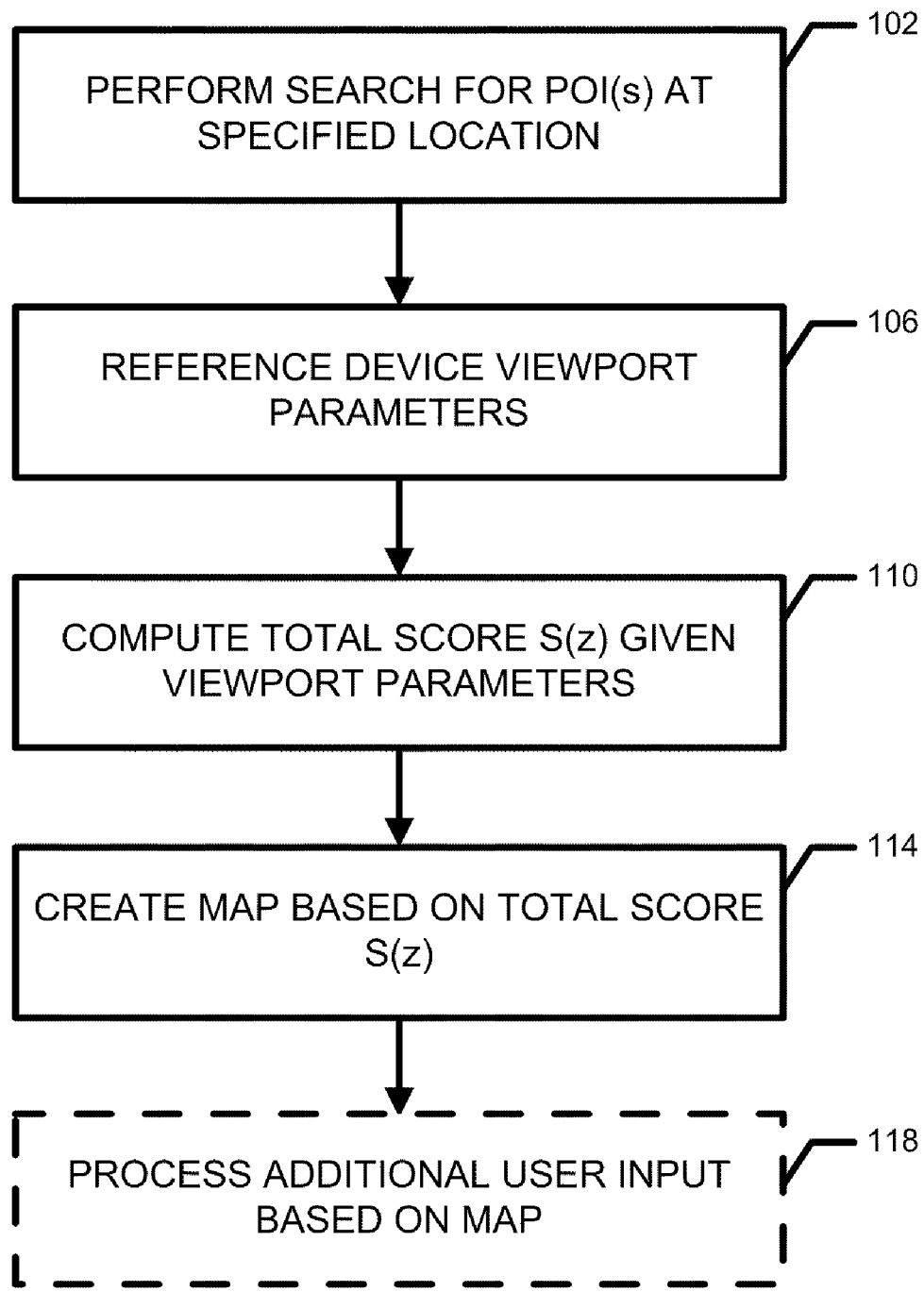
FIG. 2B is a flow chart of an embodiment of a best fit technique.

Referring to FIGS. 2A and 2B, in step 102, a user performs a search for POI's at a specified location. The location may be specified by name, latitude and longitude, or by clicking on the map, which then in turn specifies the latitude and longitude. As will be discussed later with regard to FIG. 4, searches and search results may be processed by a centralized system. In step 106, the system will reference device viewport parameters. In one embodiment this involves receiving the current viewport dimensions from the client. For example, a mobile telephone may transmit the information in a header or may respond to a request to the information, over a mobile telephone network connection. In another embodiment, the parameters may be looked up from stored tables, given the make and/or model of the client. A viewport is the area (defined by the viewport height and width) available to display and view a map that will be generated by the system and rendered by the mobile device. The viewport, as mentioned above, may be all or only some portion of the screen of the device. The parameters include the viewport height and width in terms of actual dimensions or pixels, and may include other information regarding the viewport location and screen such as the orientation or resolution etc. A viewport 202 is shown in FIG. 2A, with the map centered about map center 204.

In step 110, the system utilizes the best fit technique to determine how to best configure the map and present the search results to the user. To do so, it computes a total score S(z) based upon a number of factors.

The total score is computed according to the following equation:

$$S(z)=((F1+\ldots+Fn)*V(z, \text{Point}[Pz])*G(z))/n, \quad (1)$$

where n is the number of scoring functions, and G(z) and V(z, Point[Pz]) as described below.

Scoring Functions F1 ... Fn: Functions F1 ... Fn measure different values of points. The higher the value the higher the probability that the zoom level will be increased to show the points with that high score. One exemplary scoring function is the "normalized number of points in the viewport" since the more points the user sees on the screen the more information is provided, assuming points' icons are not heavily overlapping. This function is as follows:

$$F1(Z, Pz)=Pz/T,$$

where T is the total number of points, and Pz is the number of points in the view port for the current zoom level.

Another exemplary scoring function incorporates weighting based on a rank assigned to various points of interest based upon user ratings and/or reviews. The scoring function may also factor in current availability of a POI at any given time such as when the search is performed or at some future time, for example when a reservation is desired. Yet another exemplary scoring function is based on monetization correlated to points of interest. For example, each POI may have assigned to it a monetization value that reflects, for example, advertising or other revenue from an entity for displaying the POI.

In certain embodiments, a monetization scoring function, when incorporated as one of the functions F1 ... Fn, would result in a POI that may otherwise be outside of the displayed map area to be within the area due to the monetization factor of the POI. In other words, a different level of zoom may be selected based on the monetization factor so that the POI(s) would be displayed.

It should be understood that these are but a few exemplary scoring functions that may be utilized and that scoring functions may be added or deleted from a device utilizing the best fit technique over time.

The scoring functions F1 ... Fn preferably have a normalized output between [0 ... 1] and accept at least 2 parameters:
1. Z which is the current zoom level to be evaluated.
2. Pz which is the number of points visible in the given zoom level Z. This can in fact be expressed as discrete function Ps (z, mapCenter) for every given set of points and mapCenter.

V(z, Point [ ]): This is a visibility function taking into account the overlapping of the icons' visible points in the maps viewport. It is calculated as the ratio between the sum of currently visible area of the icons (of the POIs) in the viewport to the total area of icons in the viewport.

Having:
1. TV as Total Visible icon pixels in the viewport; and
2. TP as Total icon pixels in the viewport,
The V(z, Point [ ]) can be calculated as:

$$V(z, \text{Point}[\,])=TV/TP.$$

G(z): The purpose of this function is to emphasize some zoom levels which provide more value for the user if chosen among others because of the good visibility of street names giving the user most of the context information around the plotted points.

The output of this function is discrete, determined empirically and hence can be specified in the form of a value for a zoom magnitude or percentage or level.

In some systems, the amount of zoom is quantified in zoom levels. For the purpose of explanation, an example system with several zoom levels is discussed. For example, a system may have 17 zoom levels, wherein level 1 corresponds to the lowest zoom level and level 17 corresponds to the highest zoom level, as shown in the table below.

| Zoom Level | |
|---|---|
| Zoom Level | Zoom Name |
| 1 | Street 1 |
| 2 | Street 2 |
| 3 | Block 1 |
| 4 | Block 2 |
| 5 | Neighborhood 1 |
| 6 | Neighborhood 2 |
| 7 | City 1 |
| 8 | City 2 |
| 9 | City 3 |
| 10 | Region 1 |
| 11 | Region 2 |
| 12 | Region 3 |
| 13 | Region 4 |
| 14 | Country 1 |
| 15 | Country 2 |
| 16 | Country 3 |
| 17 | World |

As defined above, for a Low Zoom Level the map is zoomed in and less area is covered, whereas for a High Zoom Level the map is zoomed out and more area is covered.

Empirically, in such a system, it has been shown that the preferred zoom levels of users viewing POI search results on a map turns out to be levels 3 and 4, different gradations of the "block" level where blocks and the streets and street names therein are easily seen. Therefore, the function is configured (i.e. weighted with a Gaussian distribution) to reflect that, and produces a peak at those zoom levels falling down rapidly in either side of those levels (i.e. towards the lowest and highest zoom levels, e.g. 1 and 17). The form of the function should be similar to the bell-shaped Gaussian function f(x) with the peak parameter b between zoom levels 3 and 4:

$$f(x) = ae - \frac{(x-b)^2}{2c^2}.$$

In step 114, a map is created by the system. The map is then rendered at the mobile device, within the viewport. In optional step 118, the system processes further input from the user. For example if the user wishes to show additional or other points of interest, or to otherwise refine the search parameters, the process may start again at any of steps 102-114 based upon the nature of the refinement requested by the user.

Please note that the steps of FIG. 2B need not be performed in the order described or shown, and some steps may occur before/after or concurrently with other steps.

EXAMPLES

The tables in FIGS. 3A and 3B illustrate examples of the best fit technique as used in a search to determine the best fit for results of a search for sushi at a first location, and for a McDonalds at a second location, respectively. The score in the right hand column is the total score S(z), as shown in equation (1) above, reproduced below for convenience:

$$S(z)=((F1+ \ldots +Fn)*V(z, \text{Point}[Pz])*G(z))/n, \quad (1)$$

For each zoom level 1-8 (9-17 not shown) G(z), one scoring function (F1) and V(z) are shown, along with the resulting total score S(z).

In FIG. 3A, the sushi search was done to find sushi at latitude/longitude 37.77916, −122.420067. Each of zoom levels 4 and 5 achieved a total score S(z) of 0.2, the highest of any of the levels. In this example, either level 4 or 5 would be used as the best fit for the particular search results. In other words, either of these levels would, at the original map center of latitude/longitude 37.77916, −122.420067, most clearly display a sufficient number of points of interest on the map without over-clustering (with good visibility (V)).

In FIG. 3B, a search was done to find a McDonalds near latitude/longitude 37.37159, −122.038239 (a point in Sunnyvale, Calif.). Level 5 has the highest total score S(z), and a map would be rendered at zoom level 5.

Note that although (not shown in these examples) through G(z) the results are weighted to the block level, other levels may result in higher overall score S(z) and be chosen.

Figure 4:
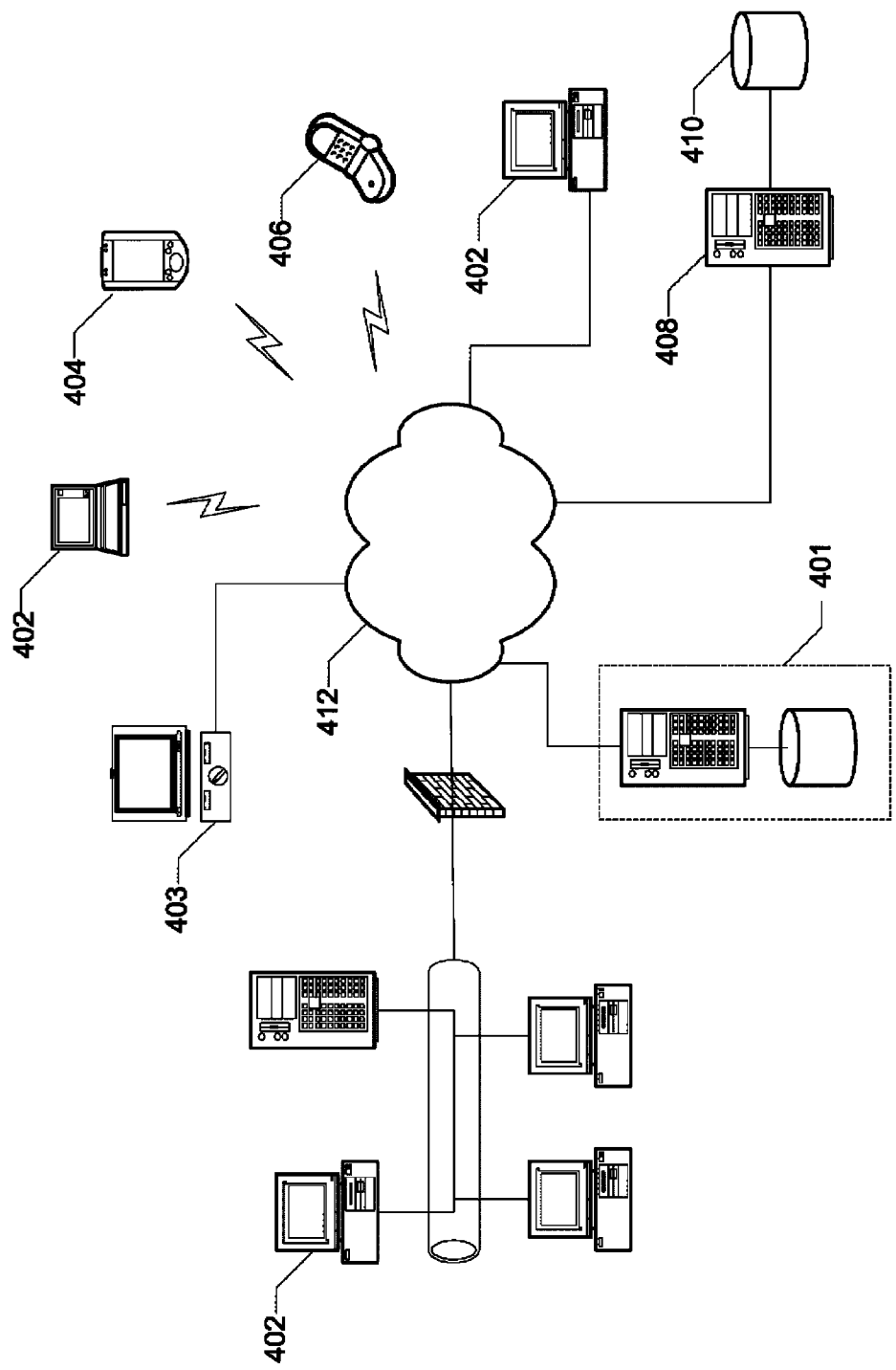
FIG. 4 is a simplified diagram of a computing environment in which embodiments of the invention may be implemented.

Such a search system may be implemented as part of a larger network, for example, as illustrated in the diagram of FIG. 4. Implementations are contemplated in which a population of users interacts with a diverse network environment, accesses email and uses search services, via any type of computer (e.g., desktop, laptop, tablet, etc.) 402, media computing platforms 403 (e.g., cable and satellite set top boxes and digital video recorders), mobile computing devices (e.g., PDAs) 404, cell phones 406, or any other type of computing or communication platform. The population of users might include, for example, users of online email and search services such as those provided by Yahoo! Inc. (represented by computing device and associated data store 401).

Regardless of the nature of the search service provider, searches may be processed in accordance with an embodiment of the invention in some centralized manner. This is represented in FIG. 4A by server 408 and data store 410 which, as will be understood, may correspond to multiple distributed devices and data stores. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 412.

In addition, the computer program instructions with which embodiments of the invention are implemented may be stored in any type of tangible computer-readable media, and may be executed according to a variety of computing models including a client/server model, a peer-to-peer model, on a standalone computing device, or according to a distributed computing model in which various of the functionalities described herein may be effected or employed at different locations.

The above described embodiments have several advantages. The map based results remain centered, minimizing disorientation to the user. This is especially advantageous on handheld devices, where in addition to looking at a small screen the user may be walking or driving at the same time. Map space is not unduly wasted and overlap of icons is minimized. Points of interest and their location on the map are more readily distinguished than in prior solutions.

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer system for providing search results to users, the computer system comprising one or more computing devices configured to:
    perform a search for points of interest at a specified location, the search producing search results;
    obtain viewport parameters including the size of the viewport;
    compute a composite score indicative of a best fit for a map including graphical representations of the search results within the viewport, the composite score computed based upon a scoring function representing a set of the points of interest, a visibility function representing overlap of the graphical representations of the search results, and a zoom level distribution function representing visibility of geographical information, wherein the best fit corresponds to a zoom level and a number of points in the viewport for the set of the points of interest; and
    provide the search results as icons upon a map sized to fit the viewport of a device according to the best fit, the map centered at the specified location.

2. The computer system of claim 1, wherein the composite score is based upon two or more unique scoring functions.

3. The computer system of claim 1, wherein a first scoring function is $F1(Z, Pz)=Pz/T$, where T is the total number of points and Pz is the number of points in the view port for a given zoom level.

4. The computer system of claim 3, wherein a second scoring function incorporates user ratings and reviews.

5. The computer system of claim 3, wherein a second scoring function incorporates a monetization factor assigned to each point of interest identified in the search results.

6. The computer system of claim 1, wherein the computer system is configured to calculate a composite score for a plurality of discrete zoom levels, and wherein the computer system is configured to select a zoom level of the plurality having the highest composite scores for the viewport parameters of the device.

7. The computer system of claim 1, wherein the computer system is configured to provide an icon for each point of interest shown on the map, and wherein the visibility function takes an area of each icon and a cumulative sum of the areas of the icons displayed into account.

8. The computer system of claim 1, wherein the zoom level distribution function emphasizes a group of zoom levels providing visibility of street names near one or more points of interest.

9. A computer system for providing search results on a map to users, the computer system comprising one or more computing devices configured to:
    perform a search for points of interest at a specified location, the search producing search results including a number of relevant points of interest;
    provide an icon for each relevant point of interest to be displayed;
    size the icon used to note the location of each relevant point of interest in relation to a viewport area and the number of relevant points of interest;
    evaluate each of a plurality of map zoom levels based upon criteria including a total area of displayed icons displayed within a viewport in comparison to the viewport area;
    assign a numerical indication of the evaluation to each map zoom level of the plurality;
    select a map zoom level having the highest numerical indication and create a map at the selected zoom level containing an icon at each relevant point of interest, the map and the icons sized to fit the viewport, said highest numerical indication indicative of a best fit for a map.

10. The computer system of claim 9, wherein the criteria further include user reviews or ratings by users, and monetization, and wherein the computer system is further configured to evaluate each of the plurality of map zoom levels based upon criteria including reviews or ratings by users, and monetization and a total displayed area.

11. A method for providing and configuring a map in conjunction with search results, the method comprising:
    performing a search for points of interest at a specified location, the search producing search results including a group of found points of interest;
    referencing viewport parameters of a user viewport including dimensions of the viewport;
    transforming the search results into an image comprising a map centered at the specified location and an icon positioned at each location of each of the group of found points of interest,
    wherein transforming comprises calculating a score based on a composite function, the score indicative of a best fit for the icons and found points of interest within the map, the composite function comprising a scoring function representing a set of the points of interest, a visibility function representing overlap of the graphical representations of the search results, and a zoom level distribution function representing visibility of geographical information, wherein the best fit corresponds to a zoom level and a number of points in the viewport for the set of the points of interest; and
    providing the image comprising the transformed search results according to the best fit.

12. The method of claim 11, wherein the composite function comprises two or more unique scoring functions.

13. The method of claim 11, wherein a first scoring function is $F1(Z, Pz)=Pz/T$, where T is the total number of points and Pz is the number of points in the view port for a given zoom level.

14. The method of claim 13, wherein a second scoring function incorporates user ratings and reviews.

15. The method of claim 13, wherein a second scoring function incorporates a monetization factor assigned to each point of interest identified in the search results.

16. The method of claim 11, wherein transforming comprises calculating a score for a plurality of discrete zoom levels, and wherein the transforming further comprises selecting a zoom level of the plurality having the highest score for the viewport parameters of the device.

17. The method of claim 11, wherein the visibility function takes an area of each icon and a cumulative sum of the areas of the icons displayed into account.

18. The method of claim 11, wherein the zoom level distribution function emphasizes a group of zoom levels providing visibility of street names near one or more points of interest.

* * * * *